United States Patent [19]

Kimura et al.

[11] Patent Number: 5,018,186

[45] Date of Patent: May 21, 1991

[54] COMMUNICATING APPARATUS PROVIDING DISCRIMINATED VOICE AND/OR IMAGE COMMUNICATION

[75] Inventors: Norio Kimura; Masahiro Takei, both of Kawasaki, Japan

[73] Assignee: Canon Kabushiki Kaisha, Tokyo, Japan

[21] Appl. No.: 340,261

[22] Filed: Apr. 19, 1989

[30] Foreign Application Priority Data

| Apr. 21, 1988 | [JP] | Japan | 63-96913 |
| Apr. 22, 1988 | [JP] | Japan | 63-99637 |
| Apr. 28, 1988 | [JP] | Japan | 63-103968 |

[51] Int. Cl.$^5$ ............................................. H04N 7/12
[52] U.S. Cl. ................................... 379/153; 379/77; 358/85; 358/343; 360/38.1
[58] Field of Search ............... 379/53, 54, 77; 358/85, 358/341, 343; 360/38.1

[56] References Cited

U.S. PATENT DOCUMENTS

| 4,199,780 | 4/1980 | Taylor | 360/38.1 X |
| 4,450,481 | 5/1984 | Dickinson | 358/86 X |
| 4,584,434 | 4/1986 | Hashimoto | 379/105 |
| 4,686,583 | 8/1987 | Tomita et al. | 360/38.1 X |
| 4,715,059 | 12/1987 | Cooper-Hart et al. | 379/53 |
| 4,747,126 | 5/1988 | Hood et al. | 379/77 X |
| 4,788,714 | 11/1988 | Hashimoto | 379/102 X |
| 4,816,905 | 3/1989 | Tweedy et al. | 358/86 |
| 4,825,457 | 4/1989 | Lebowitz | 379/40 |

FOREIGN PATENT DOCUMENTS

| 314122 | 5/1989 | European Pat. Off. | 379/53 |
| 63-193681 | 8/1988 | Japan | 379/53 |
| 63-204986 | 8/1988 | Japan . | |
| 1-49391 | 2/1989 | Japan . | |

OTHER PUBLICATIONS

Robot Research, Inc., "RVS3000RX Phoneline Video Receiver Installation & Operation Manual," Feb. 1987, Rev B.

Primary Examiner—Jin F. Ng
Assistant Examiner—Wing F. Chan
Attorney, Agent, or Firm—Fitzpatrick, Cella, Harper & Scinto

[57] ABSTRACT

There is provided a communicating apparatus such as a television telephone having the absence recording function which can communicate either one or both of an image signal and a voice signal. The apparatus comprises: a memory such as a disk-shaped recording medium to store the voice signal and image signal so as to be concerned with each other; a judgement circuit to discriminate whether or not a personal code number which is input from a destination partner side through a public telephone line coincides with the ID number recorded on the memory; a transmitter to transmit the voice signal and the image signal stored in the memory as a pair to the line in accordance with the result of the discrimination of the judgement circuit; and a reading circuit to read out the voice signal and the image signal from the memory. After the transmitter transmitted the image signal, it transmits the voice signal. Thus, the subscriber can listen to the partner's voice while observing the still image by inputting the correct personal code number to the TV telephone.

23 Claims, 9 Drawing Sheets

COMMUNICATING APPARATUS PROVIDING DISCRIMINATED VOICE AND/OR IMAGE COMMUNICATION

BACKGROUND OF THE INVENTION

1. Field of the Invention

The present invention relates to a communicating apparatus and, more particularly, to an apparatus which can communicate either one of or both of an image and a voice.

2. Related Background Art

Hitherto, as an example of such a communicating apparatus, a television telephone system using a telephone line has been known. In such a system, in the case of transmitting an image, an analog image signal is converted into a digital signal, the digital signal is first stored into a digital memory, the stored digital data is modulated into a signal in a frequency band of 300 to 3400 Hz of the telephone line, and the modulated signal is transmitted as the analog signal. On the other hand, in the case of reception, the received analog signal is demodulated and converted into digital image data and stored into the digital memory, a stored image data is converted into, for instance, a television signal, and the TV signal is supplied to a TV monitor apparatus. On the other hand, when the transmission and reception of image data are not executed, communication by a voice signal is performed in a manner similar to a conventional telephone.

With respect to such a television telephone, a function similar to the absence recording function in a conventional telephone receiving only the voice signal is demanded. In the telephone receiving only the voice signal, for instance, a message upon absence reception is recorded into a semiconductor memory or on a magnetic tape and a message from the distant side is recorded into the semiconductor memory or onto the magnetic tape. On the other hand, in a telephone using a personal code number, only when the personal code number has been received from the outside are the recorded messages are reproduced and transmitted.

However, in the case of merely storing messages into the memory, only the voice can be transmitted and no image can be transmitted.

On the other hand, with respect to the received image, if the received image is merely stored into the digital memory, the preceding stored image will be erased by the reception of the next image. On the other hand, in the case of recording the received image onto the magnetic tape or the like, in order to check whether the received image has been recorded or not, the image is first demodulated and stored into the digital memory and read out and displayed by a TV monitor, while the voice signal must be reproduced from the magnetic tape on which the voice signal was recorded. Thus, it takes a long time and the operations become complicated.

It is a large problem as to which one of the reproduced image and the received image is preferentially output to the monitor in the case where a (voice or video) signal is received from the telephone line while the recorded image signal is reproduced and checked in the absence recording mode.

SUMMARY OF THE INVENTION

It is an object of the present invention to provide a communicating apparatus which can solve all of or each of the foregoing problems.

Another object of the invention is to provide a communicating apparatus having the novel function.

Still another object of the invention is to provide a communicating apparatus which can transmit both an image signal and a voice signal as messages.

Yet another object of the invention is to provide an apparatus which can efficiently record a received voice signal and image signal in formats which are respectively suitable for each in a manner such that the reproducing process can be easily executed.

Yet another object of the invention is to provide an apparatus which can observe a received image signal at a good timing.

According to a preferred embodiment of the present invention under the above objects, there is disclosed a receiving apparatus comprising: recording and reproducing means for recording a received signal onto a recording medium and for reproducing the recorded signal on the recording medium; supplying means for supplying the received signal or the reproduced signal to a monitor; selecting means for selecting either one of the received signal and the reproduced signal of the recording and reproducing means and for transmitting the selected signal to the supplying means; reception monitoring means for monitoring the presence or absence of the signal reception; and control means for forcedly switching the selecting means to the selecting side of the received signal upon reception in accordance with an output of the reception monitoring means.

Still another object of the invention is to provide a television telephone having this novel function.

Still another object of the invention is to provide a novel communicating apparatus in which a still video is assembled.

The above and other objects and features of the present invention will become apparent from the following detailed description and the appended claims with reference to the, accompanying drawings.

DETAILED DESCRIPTION OF THE PREFERRED EMBODIMENTS

An embodiment of the present invention will be described hereinbelow with reference to the drawings.

Figure 1:
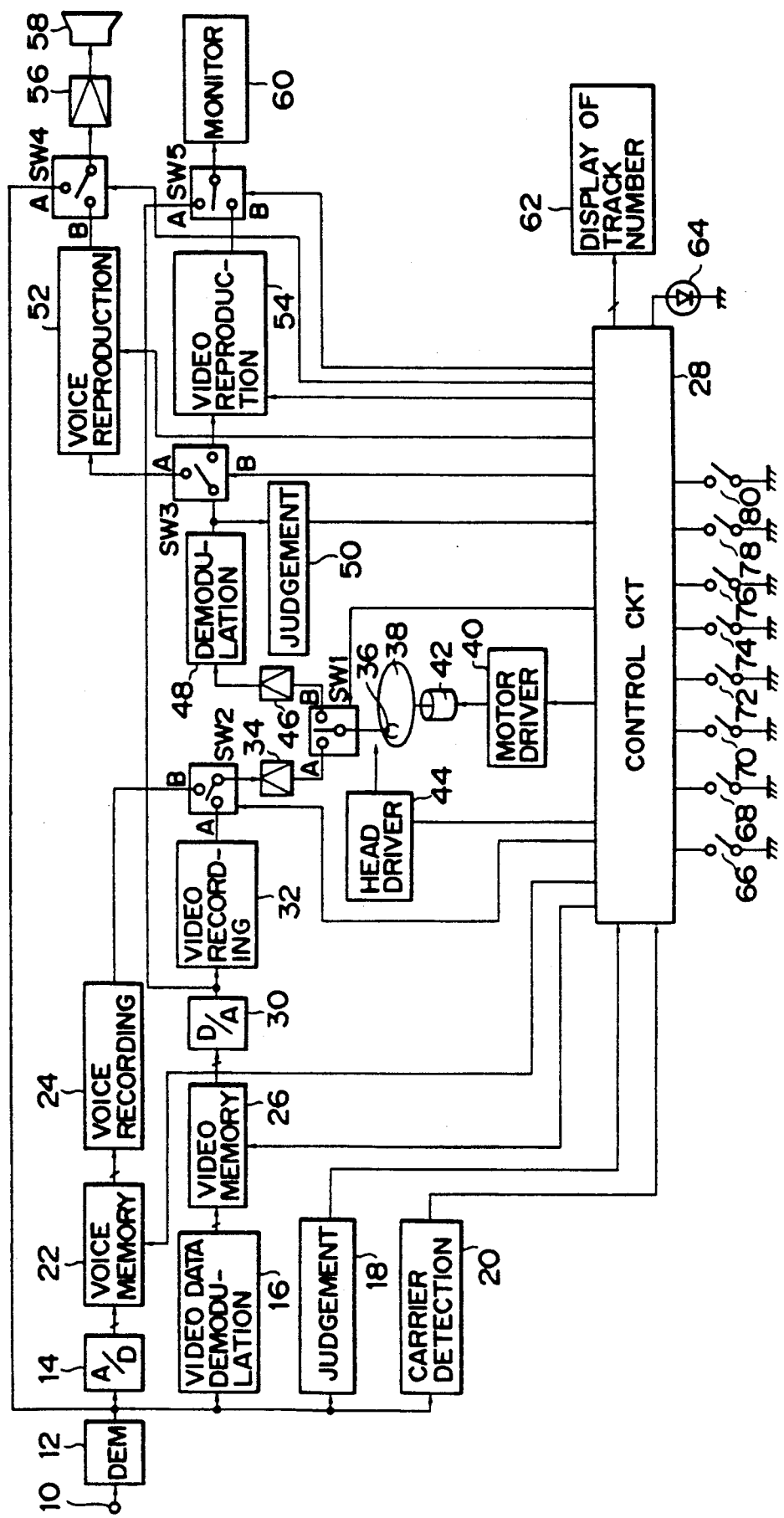
FIG. 1 is a block diagram showing a construction of an apparatus of the first embodiment according to the present invention.

FIG. 1 is a block diagram showing a construction of the embodiment of the invention.

In FIG. 1, a signal input to an input terminal 10 from a telephone line such as a public telephone line or the like is demodulated by a demodulation circuit 12. An output of the demodulation circuit 12 is supplied to an A contact of a switch $SW_4$, an A/D converter 14, a video data demodulation circuit 16, a judgement circuit 18 to discriminate whether the received signal is the voice signal or video signal on the basis of, for instance, a data signal transmitted prior to the voice signal, and a carrier detection circuit 20 to detect the presence of the input signal. An output of the A/D converter 14 is first stored into a voice memory 22. The stored data is converted into the signal format according to the voice recording format of, for instance, a video floppy disk by a voice recording circuit 24. That is, the voice signal is time base compressed and recorded onto a magnetic sheet 38. When the received signal is the video signal, the video data demodulation circuit 16 demodulates the video signal and supplies its output to a video memory 26. The stored data in the video memory 26 is read out as necessary under the control of a control circuit 28 and converted into an analog signal by a D/A converter 30. A video recording circuit 32 converts an output video signal of the D/A converter 30 into a signal format according to the video recording format of the video floppy disk.

Under the control of the control circuit 28, a switch $SW_2$ selects either one of the output (A contact) of the voice recording circuit 24 and the output (B contact) of the video recording circuit 32. The selected signal is transmitted to an A contact of a switch $SW_1$ through an amplifier 34. Upon recording to the recording medium, the switch $SW_1$ is connected to the A contact side, so that the received voice or video signal is recorded onto the magnetic sheet 38 by a recording and reproducing head 36. The magnetic sheet 38 is, for instance, a video floppy disk. The magnetic sheet 38 is rotated by a motor 42 which is controlled by a motor driver 40. The motor driver 40 is controlled by the control circuit 28. The control circuit 28, on the other hand, controls a head driver 44 so as to allow the recording and reproducing head 36 to access onto a desired track.

The result of the discrimination of the judgement circuit 18 and the result of the detection of the carrier detection circuit 20 are input to the control circuit 28. On the basis of the input detection signals, the control circuit 28 controls the switching operation of the switch $SW_2$, rotation of the motor 42, the track position to be accessed by the head 36, and the like.

In the case of reproducing the voice and video signals recorded on the magnetic sheet 38, the control circuit 28 connects the switch $SW_1$ to the B contact side. An output of the head 36 is supplied to a demodulation circuit 48 through the switch $SW_1$ and a reproducing amplifier 46. A demodulated signal of the demodulation circuit 48 is supplied to a judgement circuit 50 to discriminate whether the received signal is the voice signal or video signal. On the basis of the result of the discrimination of the judgement circuit 50, the control circuit 28 connects a switch $SW_3$ to the A contact side in the case of the voice signal and connects the switch $SW_3$ to the B contact side in the case of the video signal. Therefore, an output of the demodulation circuit 48 is supplied to a voice reproduction circuit 52 or a video reproduction circuit 54 through the switch $SW_3$.

An output of the voice reproduction circuit 52 is supplied to a B contact of the switch $SW_4$. Under the control of the control circuit 28, the switch $SW_4$ selects either one of the outputs of the demodulation circuit 12 and voice reproduction circuit 52. The selected signal is supplied to a speaker 58 through an amplifier 56. On the other hand, an output of the video reproduction circuit 54 is supplied to a B contact of a switch $SW_5$. The output of the D/A converter 30 is supplied to an A contact of the switch $SW_5$. Under the control of the control circuit 28, the switch $SW_5$ selects either one of the output (received video signal) of the D/A converter 30 and the output (reproduced video signal) of the video reproduction circuit 54. The selected signal is supplied to a video monitor 60.

Reference numeral 62 denotes a track number display to display the number of track which is at present being accessed by the head 36 and 64 indicates a light emitting diode (LED) which is lit on in the absence recording mode and flickers after the absence recording was once executed. The display 62 and LED 64 are controlled by the control circuit 28.

Reference numeral 66 denotes a reception/reproduction switch to indicate either one of the receiving mode and the reproduction mode of the magnetic sheet 38 and 68 represents a switch to indicate the absence recording mode. When the switch 66 is connected to the receiving mode side, the control circuit 28 does not accept the switch 68. Reference numeral 70 denotes a switch to indicate the track up from the position of the head 36; 72 represents a switch to contrarily indicate the track down from the position of the head 36; 74 a switch to indicate the confirmation of the whole content recorded in the absence recording mode; 76 a switch to indicate the recording of the stored content of the video memory 26 onto the magnetic sheet 38; 78 a switch to indicate the reproduction of voice data from one of the voice tracks; and 80 a switch to indicate the interruption of the voice reproduction or of the reproduction of the information recorded in the absence recording mode. The connecting states of the switches 66 to 80 or the changes thereof are successively input to the control circuit 28.

Figure 2:
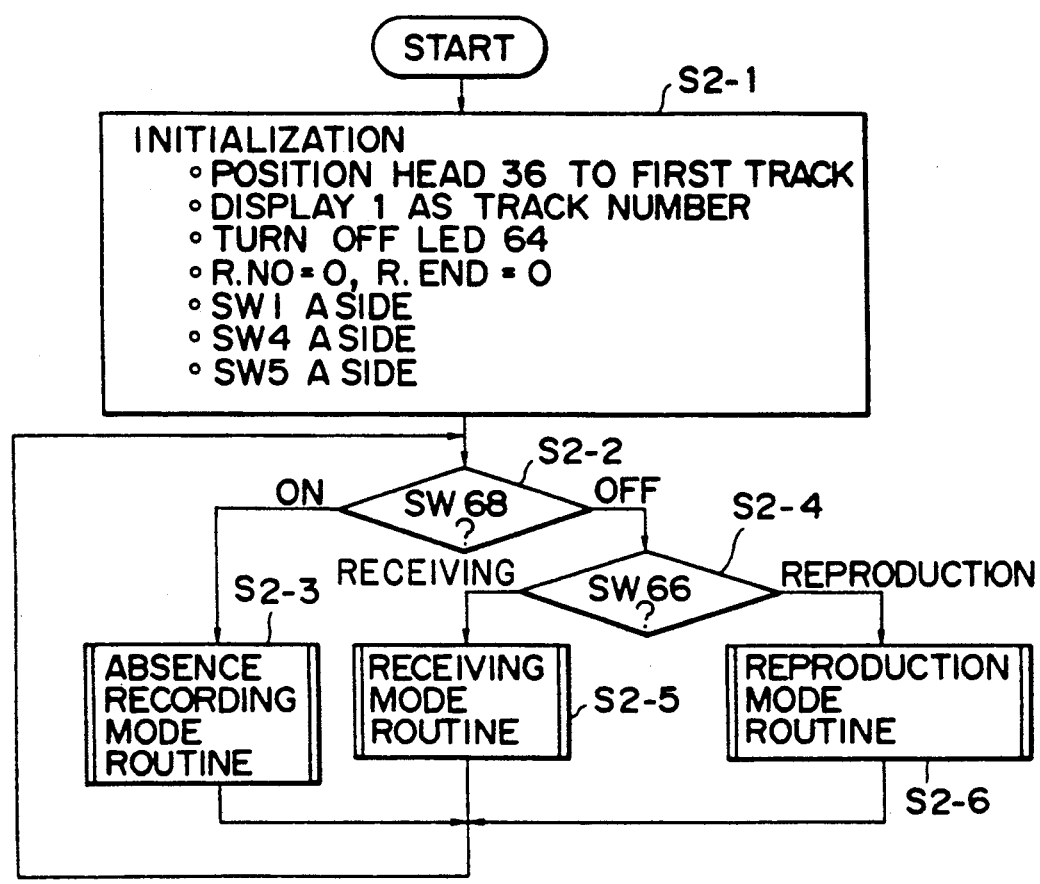
FIG. 2 is a schematic flowchart for the fundamental operation of the apparatus in FIG. 1.

FIG. 2 is a flowchart showing the whole operation of the apparatus of FIG. 1. When a power supply is turned on, an operation control program is started and the initialization is executed (step S2-1). Practically speaking, the head 36 is positioned to the first track. "1" is set to the track number which is displayed by the track number display 62. The LED 64 is turned off. The variable R.NO indicative of the number of absence recording operations is cleared. A variable R.END indicative of the last accessed track number is cleared. The switches $SW_1$, $SW_4$, and $SW_5$ are connected to the A contact side, respectively, thereby enabling the received video image to be monitored.

After completion of the initialization, the connecting state of the absence recording setting switch 68 is checked (S2-2). If the switch 68 is set to ON, the processing routine advances to the absence recording mode routine (S2-3). If the switch 68 is set to OFF, the processing routine advances to a receiving mode routine (S2-5) or a reproduction mode routine (S2-6) in accordance with the ON/OFF state of the switch 66 (S2-4). Although the detailed description is omitted, the processes in steps S2-2 to S2-6 are looped until the power supply is turned off.

Figure 3:
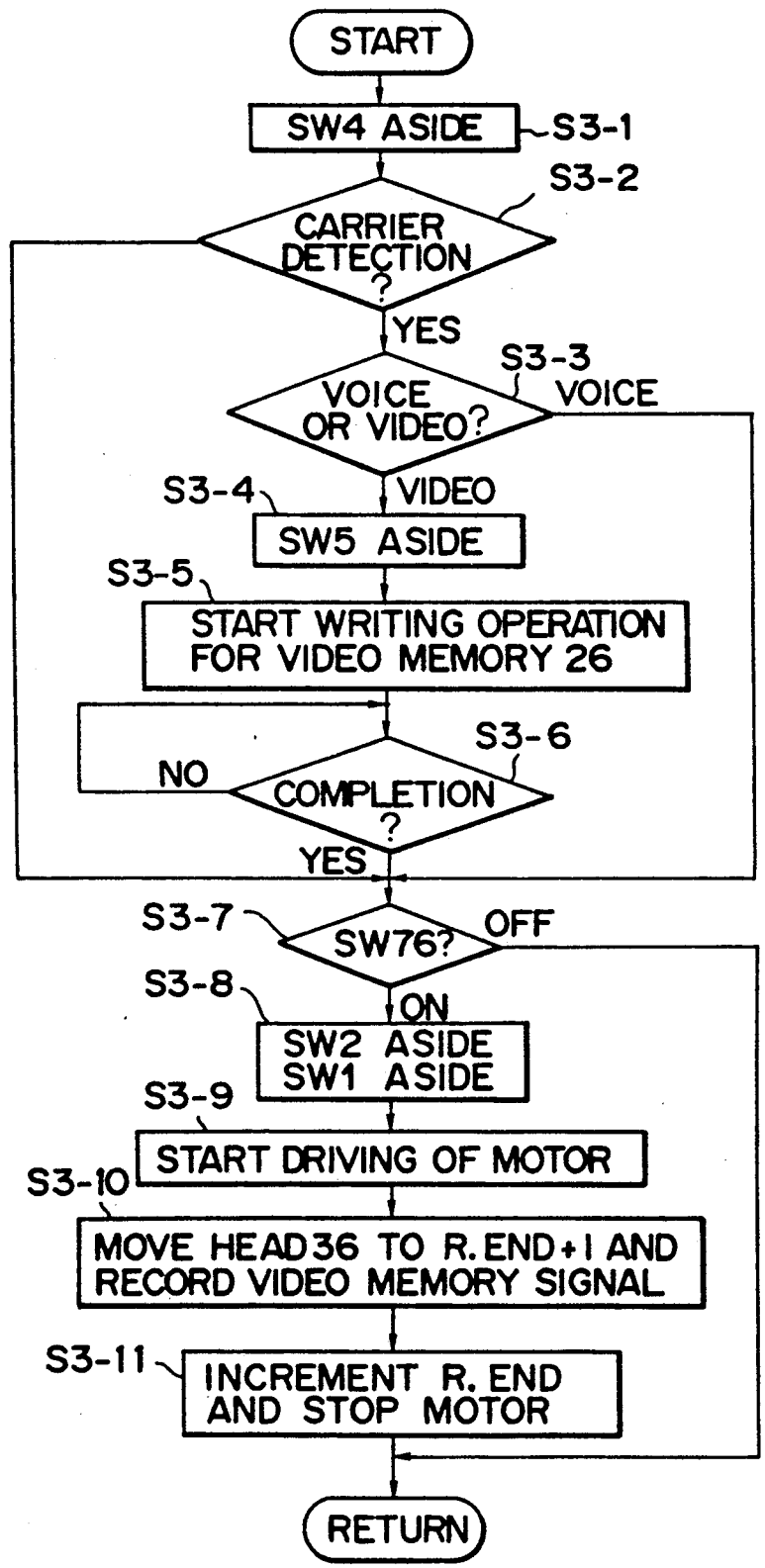
FIG. 3 is a detailed flowchart for a receiving mode routine in FIG. 2.

FIG. 3 shows the details of the receiving mode routine in step S2-5 in FIG. 2. First, the switch SW$_4$ is switched to the A side (S3-1), thereby enabling the input signal at the input terminal 10 to be monitored by the speaker 58. Next, when the carrier detection circuit 20 detects a carrier (S3-2), the result of the discrimination of the judgement circuit 18 is checked (S3-3). In the case of the video signal, the switch SW$_5$ is connected to the A side, thereby enabling the received video image to be monitored, and the writing operation into the video memory 26 is started, and the apparatus is set to the waiting mode until the completion of the writing operation (S3-4, 3-5, 3-6).

After the waiting mode was completed or if no carrier is detected in step S3-2, and if the result of the discrimination of the judgement circuit 18 indicates the voice signal in step S3-3, a check is made to see if the switch 76 has been set to ON or OFF (S3-7). If the switch 76 is ON, the switches SW$_1$ and SW$_2$ are connected to the A side, respectively, (S3-8). The motor 42 is rotated (S3-9). The head 36 is allowed to access the track next to the last recorded track, that is, to the track having the track number (R.END+1) and the output of the video recording circuit 32 is recorded onto the magnetic sheet 38 (S3-10). Thereafter, the R.END is increased by "1" and the rotation of the motor 42 is stopped (S3-11).

Even when no carrier is detected in step S3-2, or even if the voice signal has been received in step S3-3, since the image signal stored in the video memory 26 is transmitted to the monitor 60, erroneous recording can be prevented.

Figure 4:
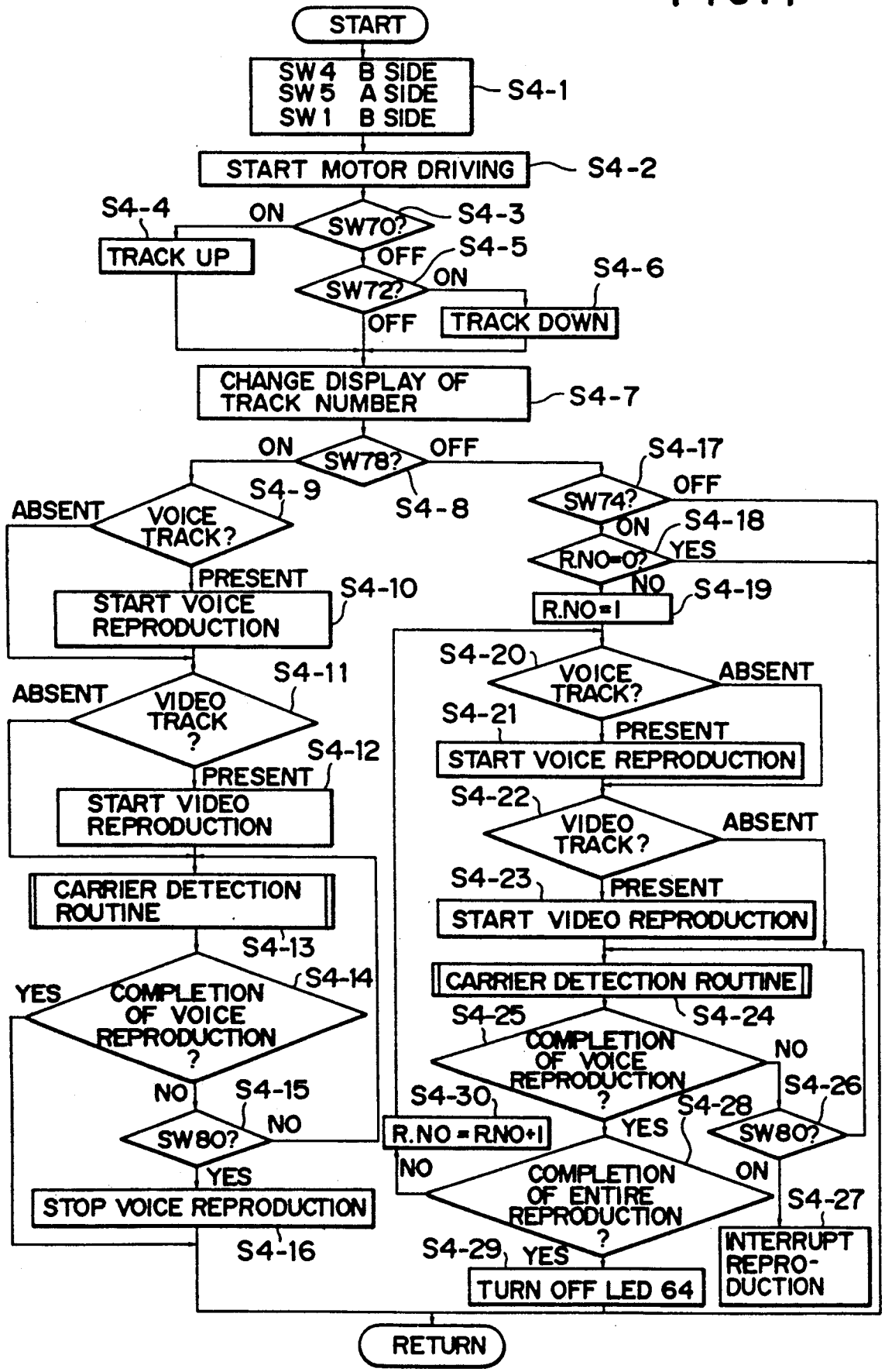
FIG. 4 is a detailed flowchart for a reproduction mode routine in FIG. 2.

FIG. 4 shows a detailed flowchart for the reproduction mode routine (S2-6) in FIG. 2. First, the switches SW$_1$, SW$_4$, and SW$_5$ are connected to the B side, respectively, thereby allowing the reproduced signal to be supplied to the speaker 58 and video monitor 60 (S4-1). The driving of the motor 42 is started, thereby enabling the signal to be reproduced (S4-2). The track up or down operation is executed in accordance with the connecting states of the track up switch 70 and track down switch 72 (S4-3 to S4-6). The track number which is displayed by the track number display 62 is changed in accordance with a change in track (S4-7).

Next, by checking the connecting state of the switch 78, it is decided to see if the voice signal on the track which is at present being accessed is reproduced or not (S4-8). If the switch 78 is ON, the voice signal is reproduced from the voice track (S4-10). The video signal is reproduced from the video track (S4-12). Practically speaking, the presence or absence of the voice track is checked (S4-9). If the voice track exists, the track (if the present track is the voice track, this track) is accessed, the switch SW$_3$ is switched to the A side, the voice data of one track is fetched, and the voice reproduction is started (S4-10). If the track which is at present being accessed is the video track, a decision with respect to whether the voice track corresponding to the video track exists or not is made by previously examining the correspondence relation between the video tracks and the voice tracks or by searching each time. When the video track exists (S4-11), the track is accessed, the switch SW$_3$ is switched to the B side, and the video reproduction is started (S4-12).

Figure 5:
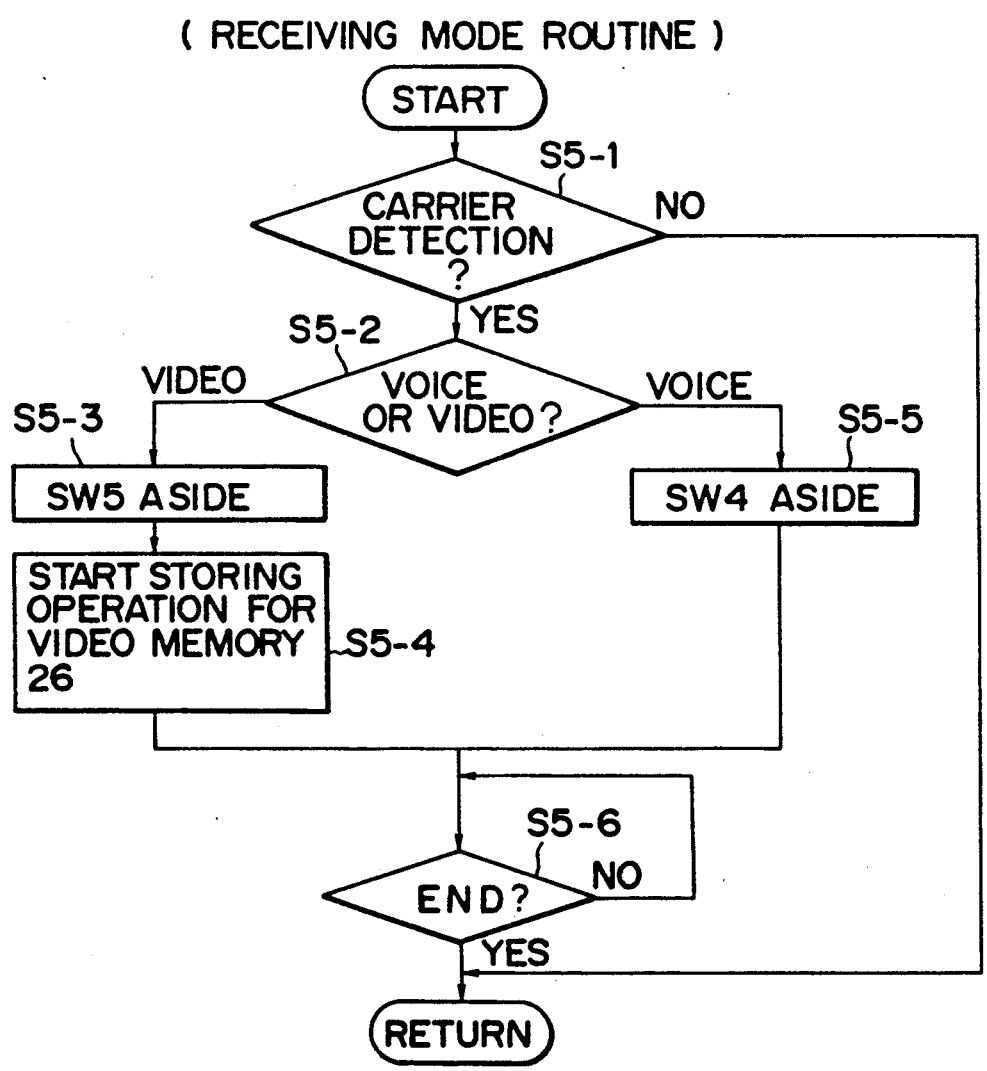
FIG. 5 is a flowchart for a carrier detecting routine in FIG. 4.

If a received signal, particularly, a video signal has been received during the reproducing operation as mentioned above, the received signal needs to be preferentially supplied to the speaker 58 and video monitor 60. Therefore, even during the reproduction of the signal from the medium, the carrier detecting routine (S4-13) is started and the presence or absence of the carrier is checked by the carrier detection circuit 20. FIG. 5 shows the details of the carrier detecting routine. An output of the carrier detection circuit 20 is checked (S5-1). If no carrier is detected, the processing routine is returned and if the carrier is detected, a check is made to see if the received signal is the voice signal or video signal on the basis of the output of the judgement circuit 18 (S5-2). In the case of the video signal, the switch SW$_5$ is connected to the A side and the writing operation to the video memory 26 is started (S5-3, S5-4). On the other hand, in the case of the voice signal, the switch SW$_4$ is connected to the A side (S5-5). The apparatus is set to the waiting mode to keep such a state until the completion of the receiving operation (S5-6). That is, the reproduction of the signal from the magnetic sheet is released until the completion of the reception.

Returning to FIG. 4, after completion of the carrier detecting routine (S4-13), a check is made to see if the voice reproduction in step S4-10 has been finished or not (S4-14). If YES, the carrier detecting routine is completed and if NO, a check is made to see if the voice reproduction interrupting switch 80 has been set to ON or OFF (S4-15). If the switch 80 is ON, the voice reproduction is interrupted (S4-16). If the switch 80 is OFF, the processing routine is returned to step S4-13 and the carrier is detected.

If the switch 78 is OFF in step S4-8, a check is made to see if the absence recording checking switch 74 has been turned ON or OFF (S4-17). If the switch 74 is OFF, the processing routine is finished and if it is ON, the presence (the variable R.NO is not "0") or absence of the absence recording is checked (S4-18). The reproducing operation of the content recorded in the absence recording mode is started. First, the R.NO is set to "1" to reproduce from the first recorded content (S4-19) and the voice track and video track are reproduced. Practically speaking, the presence or absence of the voice track is checked. If the voice track exists, the voice reproduction is started (S4-21) by a procedure similar to the case of S4-10. Next, the presence or absence of the video track is checked (S4-22). If the video track exists, the video reproduction is started (S4-23) by a procedure similar to the case of step S4-12. After the voice reproduction and video reproduction were started, the carrier detecting routine similar to step S4-13 is started (S4-24) for preparation of the reception during the reproduction.

Subsequently, a check is made to see if the voice reproduction in step S4-21 has been finished or not (S4-25). If NO, a check is made to see if the reproduction interrupting switch 80 has been turned ON or OFF (S4-26). If the switch 80 is ON, the reproduction of the content recorded in the absence recording mode is interrupted (S4-27) and the routine is completed. If the voice reproduction has been finished in step S4-25, a check is made to see if all of the contents recorded in the absence recording mode have completely been reproduced or not (S4-28). If any contents which are not reproduced still remain, the R.NO is increased by "1" (S4-30) and the processing routine is returned to step S4-20 and the next recorded signal is reproduced. If all of the contents have been reproduced, the LED 64 is lit off (S4-29) and the routine is finished.

Figure 6:
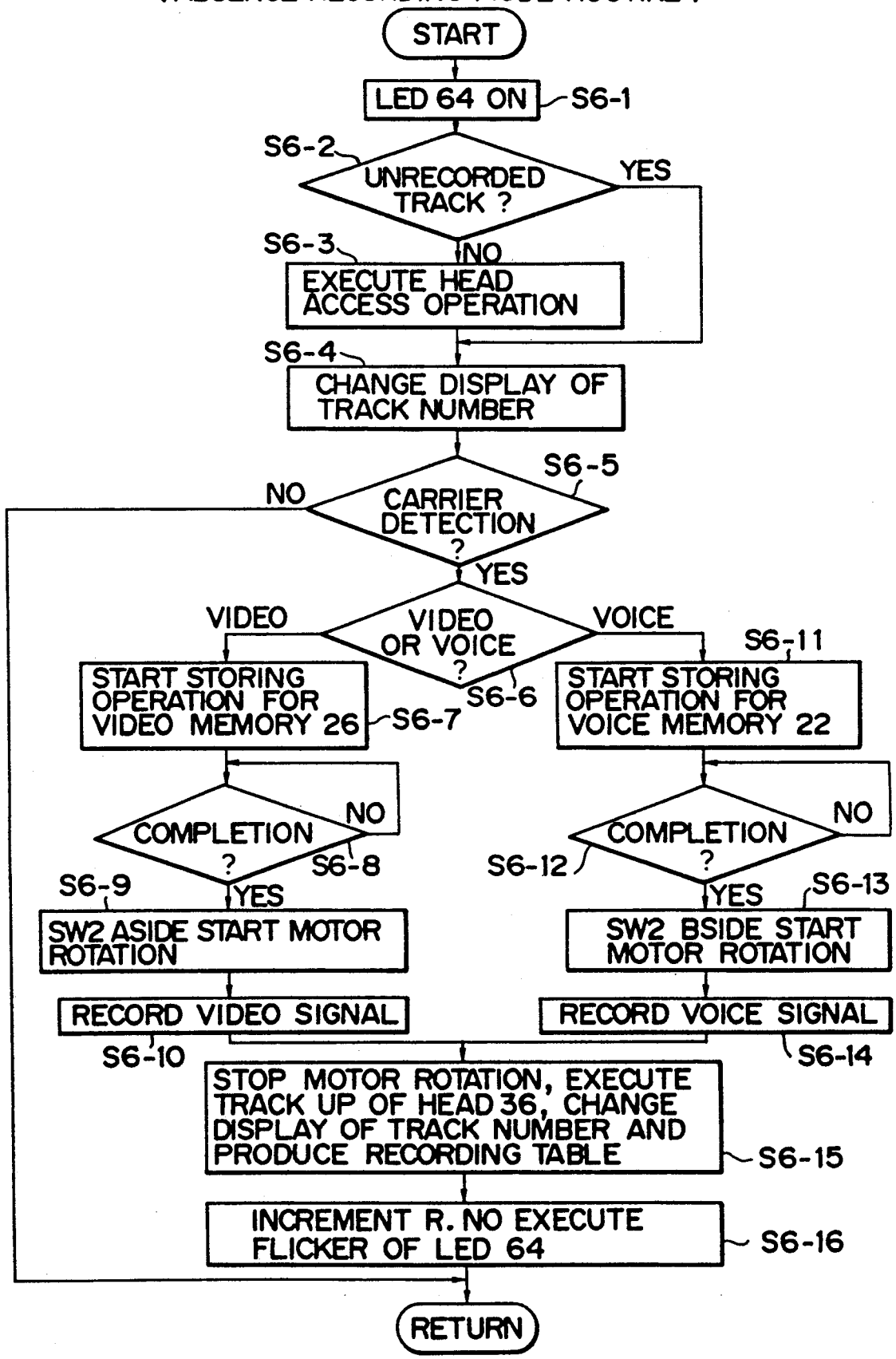
FIG. 6 is a detailed flowchart for an absence recording routine in FIG. 2.

FIG. 6 shows the details of the absence recording mode routine (S2-3) in FIG. 2. The LED 64 is lit on (S6-1) to indicate that the apparatus is in the absence recording mode. The head 36 is moved to the (R.END +1) track (S6-2, S6-3) to access to the track next to the last track which was recorded by the receiving mode routine or absence recording mode routine. At the same time, the track number to be displayed is changed (S6-4) and the apparatus waits for the next signal reception. When the carrier is detected by the carrier detection circuit 20 (S6-5), a check is made to see if the received signal is the video signal or voice signal on the basis of the output of the judgement circuit 18 (S6-6). In the case of the video signal, the processing routine advances to step S6-7 and subsequent steps. In the case of the voice signal, the processing routine advances to step S6-12 and subsequent steps. In the case of the video signal, the received data is stored into the video memory 26 (S6-7, S6-8). Thereafter, the switch SW$_2$ is connected to the A side and the motor 42 is rotated (S6-9). The recording operation to the magnetic sheet 38 is executed (S6-10). On the other hand, in the case of the voice signal, after the received data was stored into the voice memory 22 (S6-11, S6-12), the switch SW$_2$ is connected to the B side and the motor 42 is rotated (S6-13). The recording operation to the magnetic sheet 38 is executed (S6-14).

After completion of the recording operation to the magnetic sheet 38, the rotation of the motor 42 is stopped the head 36 is moved to the next track, the track number to be displayed is changed, a recording table showing the correspondence relation between the video tracks and the voice tracks as shown in Table 1 is made, and the R.END is increased by "1" (S6-15).

TABLE 1

| R. NO | Video track | Voice track |
| --- | --- | --- |
| 1 | 1 | 2 |
| 2 | 3 | |
| 3 | | 4 |
| 4 | 5 | 6 |
| 5 | 7 | 8 |
| . | . | . |
| . | . | . |
| . | . | . |

In this case, it is assumed that the endless recording is executed in a manner such that when the head has reached the last recording track on the magnetic sheet 38, the head is returned to the first track. After the absence recording was executed once, the R.NO is increased by "1", the LED 64 is set to the flickering mode (S6-16), and the routine is finished.

In the embodiment, the rotating magnetic sheet has been used as a recording medium. However, the invention is not limited to this. For instance, the invention can be also applied to a recording and reproducing apparatus such as a VTR using a tape-shaped recording medium. On the other hand, although the embodiment has been described with respect to an apparatus having only the receiving function, the invention can be also applied to an apparatus such as an ordinary television telephone having both transmitting and receiving functions.

As will be easily understood from the above description, according to the embodiment, since the recording medium is circularly used, the information recorded in the absence recording mode is erased in order from the oldest one, so that the recorded content can be again confirmed. On the other hand, the useful life of the recording medium can be prolonged owing to the circulative use.

Further, according to the embodiment, since the received signal is preferentially received in the receiving mode even during reproduction and confirmation of the content recorded in the absence recording mode, a situation in which the signal reception is overlooked is eliminated and the operating efficiency is improved.

Figure 7:
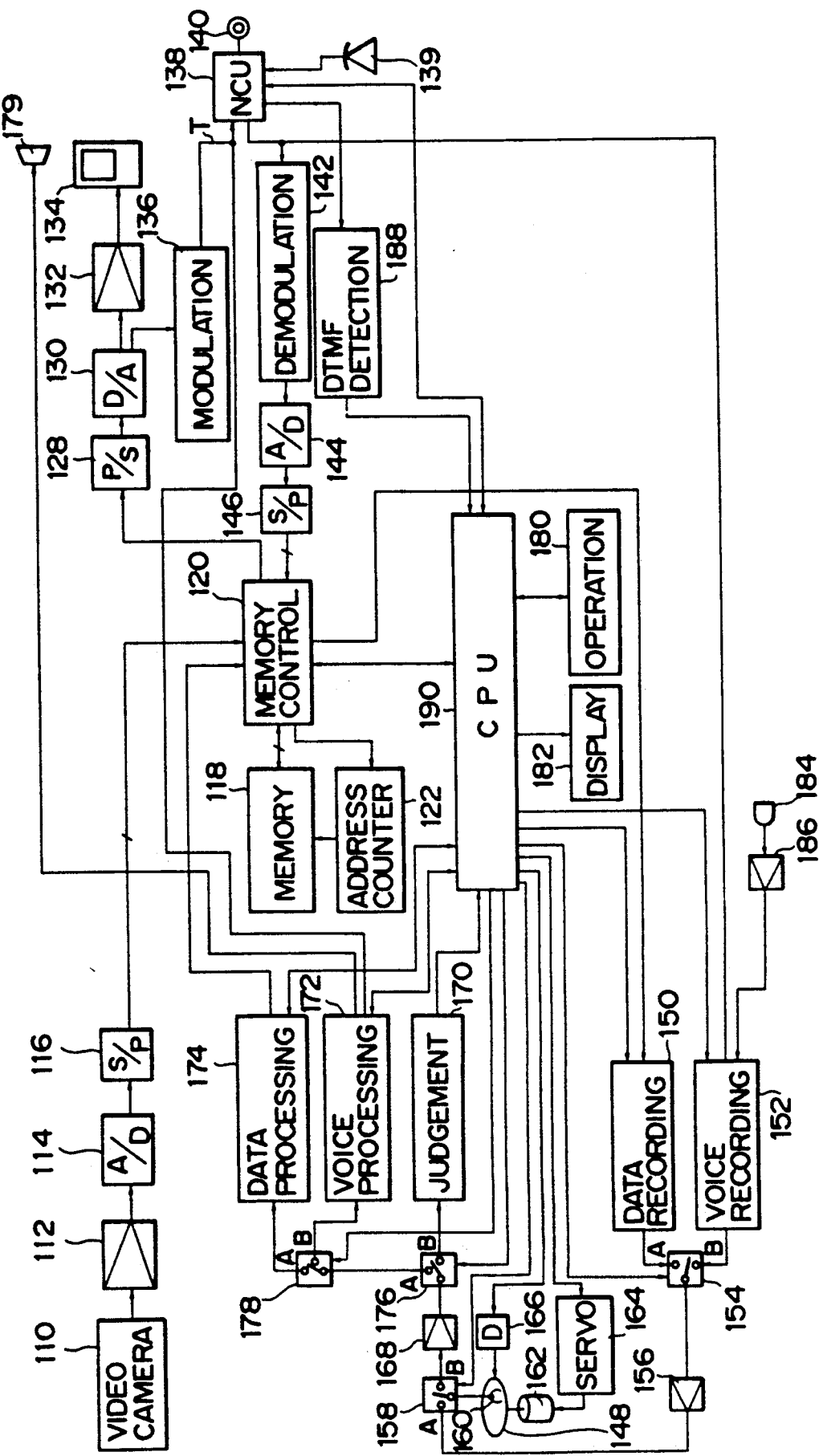
FIG. 7 is a block diagram showing a construction of an apparatus in the second embodiment of the invention.

FIG. 7 shows a block diagram showing a construction of the second embodiment of the invention.

In FIG. 7, reference numeral 110 denotes a video camera; 112 indicates an amplifier; 114 an A/D converter to convert an output (analog signal) of the amplifier 112 into a digital signal; 116 a serial/parallel (S/P) converter to convert a serial output of the A/D converter 114 into a parallel signal; 118 a memory to temporarily store data; 120 a memory control circuit to control the writing and reading operations for the memory 118; 122 an address counter to generate an address signal of the memory 118; 128 a parallel/serial (P/S) converter to convert parallel image data transmitted from the memory 118 through the memory control circuit 120 into serial data; 130 a D/A converter to convert an output of the P/S converter 128 into an analog signal; 132 a video buffer; and 134 a video monitor.

Reference numeral 136 denotes a modulator to modulate an analog signal of the D/A converter 130 into a frequency signal having frequencies within a range from 300 to 3400 Hz adapted to the telephone line; 138 indicates a network control unit (NCU); 139 a conventional voice telephone; 140 a connecting terminal to connect with the telephone line; 142 a demodulator to demodulate the signal input from the telephone line; 144 an A/D converter to convert an analog output of the demodulator 142 into a digital signal; and 146 an S/P converter to convert a serial output of the A/D converter 144 into a parallel output.

Reference numeral 148 denotes a magnetic sheet such still video floppy disk onto which an image and a voice can be recorded. Reference numeral 150 denotes a data recording circuit for adding a predetermined code including an error correction code to the digital image data in the memory 118 which was input through the memory control circuit 120 and for converting the image data into the signal format adapted to the recording format of the magnetic sheet 148; and 152 a voice recording circuit for time base compressing or frequency modulating the voice signal transmitted from the telephone line and for converting into the recording format of the magnetic sheet 148. Reference numeral 154 denotes a selecting switch to select either one of outputs of the data recording circuit 150 and voice recording circuit 152; 156 a recording amplifier; 158 a switch which is connected to the A contact side upon recording onto the magnetic sheet 148 and is connected to the B contact side upon reproduction; 160 a recording and reproducing head; 162 a motor to rotate the magnetic sheet 148; 164 a servo circuit to keep the rotation of the motor 162 constant; and 166 a head driver to move the head 160 to a designated track position on the magnetic sheet 148.

Reference numeral 168 denotes a reproducing amplifier; 170 indicates a judgement circuit to discriminate whether the reproduced signal from the magnetic sheet 148 is the voice signal or data; 172 a voice processing circuit; 174 a processing circuit for executing data processes and writing the processed data into the memory 118; 176 and 178 change-over switches for allowing an output of the reproducing amplifier 168 to be supplied to either one of the judgement circuit 170, voice processing circuit 172, and data processing circuit 174; 179 a speaker; 180 an operation panel comprising various kinds of switches and the like to indicate a desired operation; 182 a display to display various kinds of visual images; 184 a microphone; 186 an amplifier; 188 a DTMF detector to detect and decode a DTMF signal input from the outside; and 190 a CPU to perform the whole control.

The operation of the apparatus of FIG. 7 will now be described. In the case where the apparatus is used as an ordinary television telephone, an image signal of the video camera 110 is supplied to the P/S converter 128 through the amplifier 112, A/D converter 114, S/P converter 116, and memory control circuit 120. An output of the P/S converter 128 is supplied to the video monitor 134 through the D/A converter 130 and video buffer 132. Thus, the image picked up by the video camera 110 is displayed on the video monitor 134.

In the case of performing the voice communication, a distant partner is called by the telephone 139. A call signal is sent to the exchange station through the NCU 138, terminal 140, and telephone line, so that the user's apparatus is connected to the partner subscriber.

In the case of transmitting an image, a predetermined indication signal to transmit the image is input from the operation panel 180 to the CPU 190. The instruction signal is sent to the memory control circuit 120 via the CPU 190. The memory control circuit 120 allows the image pickup signal of the video camera 110 to be temporarily stored into the memory 118. At this time, the memory control circuit 120 gives an instruction to output a proper write address signal to the address counter 122. After completion of the writing operation into the memory 118, the memory control circuit 120 then allows the stored data in the memory 118 to be sequentially read out. The output of the memory 118 is supplied to the video monitor 134 through the P/S converter 128, D/A converter 130, and video buffer 132. Thus, the pickup image of the video camera 110 is displayed as a still image by the video monitor 134.

Prior to transmitting the image data, the CPU 190 outputs a command indicative of the image data to the output memory control circuit 120. The memory control circuit 120 adds the output image data of the memory 118 after the command and then supplies to the P/S converter 128. The serial signal from the P/S converter 128 is supplied to the modulator 136 through the D/A converter 130 and is amplitude phase modulated. An output of the modulator 136 is sent to the telephone line through the NCU 138 and terminal 140.

Assuming that the television telephone on the reception side also has a construction similar to FIG. 7, on the reception side, the command and image data which were input from the telephone line are input from the terminal 140 to the NCU 138. The NCU 138 transmits them to the demodulator 142. The signal demodulated by the demodulator 142 is supplied to the memory control circuit 120 through the A/D converter 144 and S/P converter 146. The memory control circuit 120 transfers the command to the CPU 190. In accordance with the command, the CPU 190 controls the NCU 138 and disconnects the telephone 139 from the telephone line. Thus, the apparatus prevents the image data from changing into an unpleasant voice. On the other hand, the CPU 190 also controls the memory control circuit 120 so as to store the received image data into the memory 118. When the received image data is stored into the memory 118 in this manner, the memory control circuit 120 reads it out and supplies to the P/S converter 128. The output of the P/S converter 128 is supplied to the video monitor 134 through the D/A converter 130 and video buffer 132. Thus, the image from the distant partner side is displayed on the video monitor 134. On the other hand, after completion of the image reception, the NCU 138 connects the telephone line to the telephone 139. Thus, voice communication with the partner can be again executed.

The operation in the absent mode will now be described. For the absent mode, the image and voice message for response upon absence reception need to be preliminarily recorded onto the magnetic sheet 148. Such a recording operation is indicated by the operation panel 180. In accordance with such an indication, the CPU 190 allows the head driver 166 to position the head 160 to an unrecorded track Next, the image to be recorded, for instance, the face of the user himself, is picked up and input by the video camera 110. The pickup image of the video camera is written into the memory 118. The servo circuit 164 rotates the motor 162 at a constant speed in accordance with the instruction from the CPU 190. The CPU 190 supplies the ID number (for instance, a number having four digits) to specify the data stored in the memory 118 and the recording track number of the voice message corresponding to the stored data to the data recording circuit 150 and transfers the stored data in the memory 118 to the data recording circuit 150 through the memory control circuit 120. The data recording circuit 150 outputs those input data as a signal in a predetermined format. An output of the data recording circuit 150 is supplied to the head 160 through the switch 154, recording amplifier 156, and switch 158 and recorded onto the magnetic sheet 148.

The ID number is input to the CPU 190 by operating a ten-key provided in the operation panel 180.

After the image data was recorded, the head 160 is moved to the next unrecorded track. The motor 162 rotates at the voice recording speed which is set by the servo circuit 164. The voice message input from the microphone 184 is subjected to the processes such as time base compression, modulation, or the like and is converted into a predetermined format by the voice recording circuit 152. The processed voice message signal is supplied to the head 160 through the switch 154, recording amplifier 156, and switch 158 and is recorded onto the magnetic sheet 148.

In this manner, the images and voice messages of the number of special presumed persons are recorded, thereby composing the absence recording magnetic sheet. In the embodiment, the message is transmitted to the partner only when a special personal code number is input. Therefore, for upon absence reception, the fundamental information indicating that the user himself is at present absent, it is necessary to first transmit the special personal code number, and the like is transmitted by the voice signal to the partner. Such a fundamental message has been recorded at a predetermined location on the magnetic sheet 148.

Figure 8:
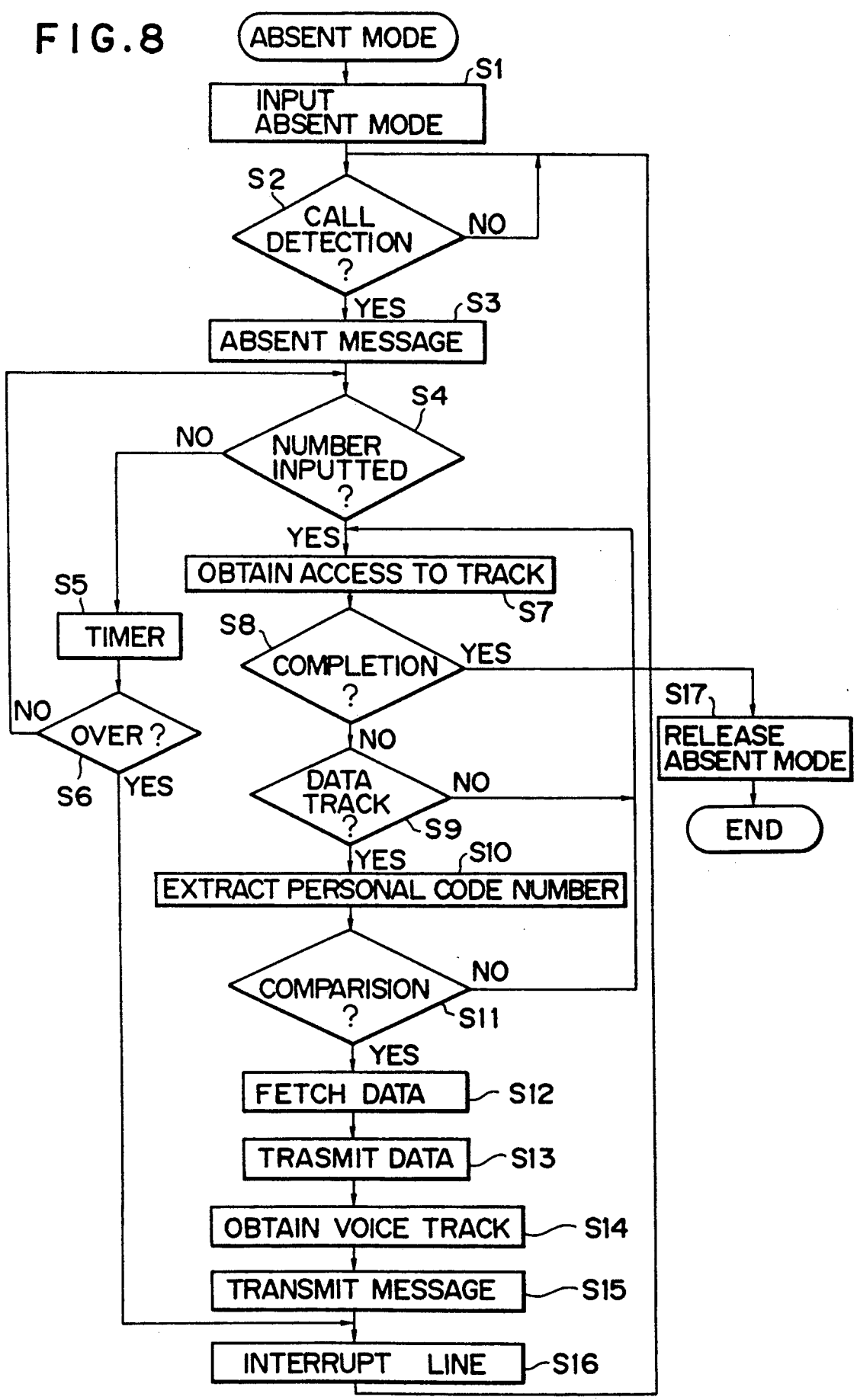
FIGS. 8 to 10 are flowcharts showing the operation of the apparatus shown in FIG. 7.

The receiving operation in the absent mode will now be described with reference to FIG. 8. First, the absent mode is set by the operation panel 180 (step S1) and the apparatus waits for a telephone call from the outside (S2). When a call detector in the NCU 138 detects the telephone call, the presence of the telephone call is informed to the CPU 190. The CPU 190 controls the servo circuit 164 so as to allow the magnetic sheet 148 to rotate at a constant speed and also controls the head driver 166 to move the head 160 to the recording track on which the fundamental message has been recorded. The switch 176 is connected to the B side, so that the output of the head 160 is supplied to the judgement circuit 170 through the switch 158, reproducing amplifier 168, and switch 176. Since the output of the head 160 is the voice signal, the CPU 190 connects the switch 176 to the A side and connects the switch 178 to the B side on the basis of the result of the discrimination of the judgement circuit 170. Thus, the reproduced signal is transferred to the voice processing circuit 172. The voice processing circuit 172 executes well-known processes such as time base expansion, demodulation, and the like and outputs the ordinary voice signal. The output of the voice processing circuit 172 is transmitted to the telephone line through the NCU 138 (S3).

Then, the apparatus waits for the reception of the personal code number (S4). If the correct personal code number is not transmitted even after the lapse of a predetermined time, the apparatus is disconnected from the telephone line (S5, S6).

When the apparatus receives the personal code number based on the beep sound of a push button telephone on the originating call side, for instance, the DTMF detector 188 decodes the personal code number and supplies the decoded data to the CPU 190. The CPU 190 sequentially moves the head 160 to the respective tracks and searches the message corresponding to the received personal code number. That is, the head 160 is sequentially moved to the tracks on which the image data has been recorded (S9). The output of the head 160 is supplied to the data processing circuit 174. The data processing circuit 174 performs the demodulation and the like and first extracts the ID number added to the head of the image signal and the recording track number on which the corresponding voice message has been recorded and supplies the extracted numbers to the CPU 190 (S10). The CPU 190 compares the ID number with the received personal code number. When they differ, the head 160 is allowed to sequentially access the other tracks and all of the tracks are searched until those numbers coincide (S11). If the ID number does not coincide with the received personal code number with respect to all of the tracks, for instance, a warning is sent to the telephone line and the line is disconnected.

When the image data whose ID number coincides with the received personal code number is found out, the image data which is output from the data processing circuit 174 is once stored into the memory 118 through the memory control circuit 120 (S12). Then, the stored image data is again read out of the memory and sent to the telephone line through the memory control circuit 120, P/S converter 128, D/A converter 130, modulator 136, and NCU 138 (S13). Thereafter, the head 160 is moved to the recording track of the corresponding voice message (S14). The voice message is reproduced from this track and is converted into the ordinary voice signal by the time expansion, demodulation, and the like by the voice processing circuit 172 and the voice message is transmitted to the telephone line via the NCU 138 (S15). After the voice message was transmitted, the line is disconnected and the apparatus waits for the next telephone call (S2).

According to the embodiment, in the case of transmitting to the distant partner side, the image data is first transmitted. Therefore, on the reception side, the voice is heard while observing the image which has been received previously, so that the use efficiency is good.

If the track whose ID number coincides with the received personal code number does not exist and the searching operation of all of the tracks is completed, the absent mode is released (S8, S17) and the ordinary telephone operation is executed.

Figure 9:
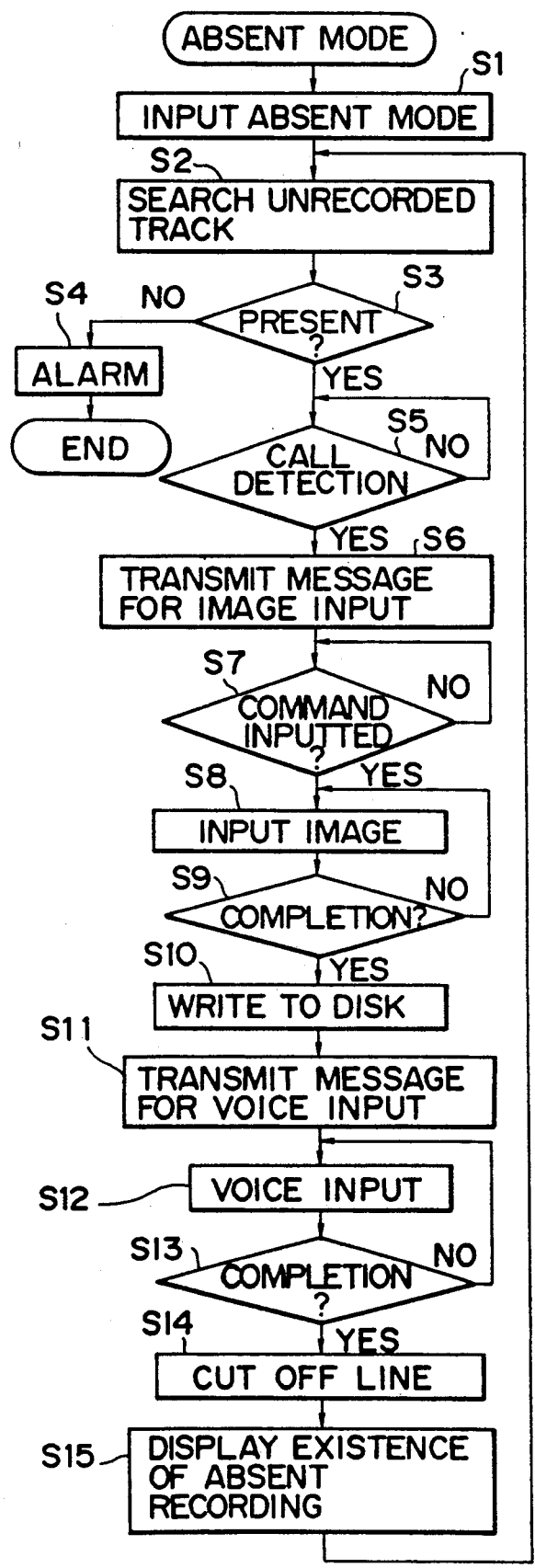

Another embodiment in the absent mode will now be described with reference to FIG. 9.

A predetermined instruction is input from the operation panel 180 and the apparatus is set to the absent mode (S1). In response to the absent mode, the CPU 190 allows the head driver 166 to position the head 160 to the unrecorded track (S2). Whether the track is the unrecorded track or not can be discriminated from the reproduced output of each track. When no unrecorded track exists, since there is no allowance of the absent recording, a warning is generated and the processing routine is finished (S3, S4). After the head 160 is positioned to the unrecorded track, the apparatus waits for the reception of the call signal from the distant partner side (S5). When the NCU 138 detects the call signal, the NCU informs the partner of the fact that the apparatus is at present in the absence recording mode and image data and a voice signal can be stored. Such a response message is previously recorded on a proper track on the magnetic sheet 148.

Practically speaking, a message to promote the image input is first transmitted to the partner side (S6). The apparatus waits for the reception of a command (S7). When the command to transmit the image is sent, the image subsequent to the command is received and stored into the memory 118 (S8, S9). After the image data is stored, the CPU 190 rotates the motor 162 at a constant speed and the number of track onto which the image data is to be recorded, the recording track number of the corresponding voice data, date information of year, month, and day of the storage, and image data stored in the memory 118 are supplied to the data recording circuit 150 and recorded onto the magnetic sheet 148 (S10).

Next, a message to promote the voice transmission is sent to the partner side (S11). The transmitted voice is processed by the voice recording circuit 152 and is recorded onto the magnetic sheet 148 (S12, S13).

After the received image and voice are recorded, the line of the CPU 190 is disconnected (S14) and the existence of the absence recording is displayed by the display 182 (S15).

The above operations are continued until the unrecorded track is extinguished or until the absent mode is released.

Figure 10:
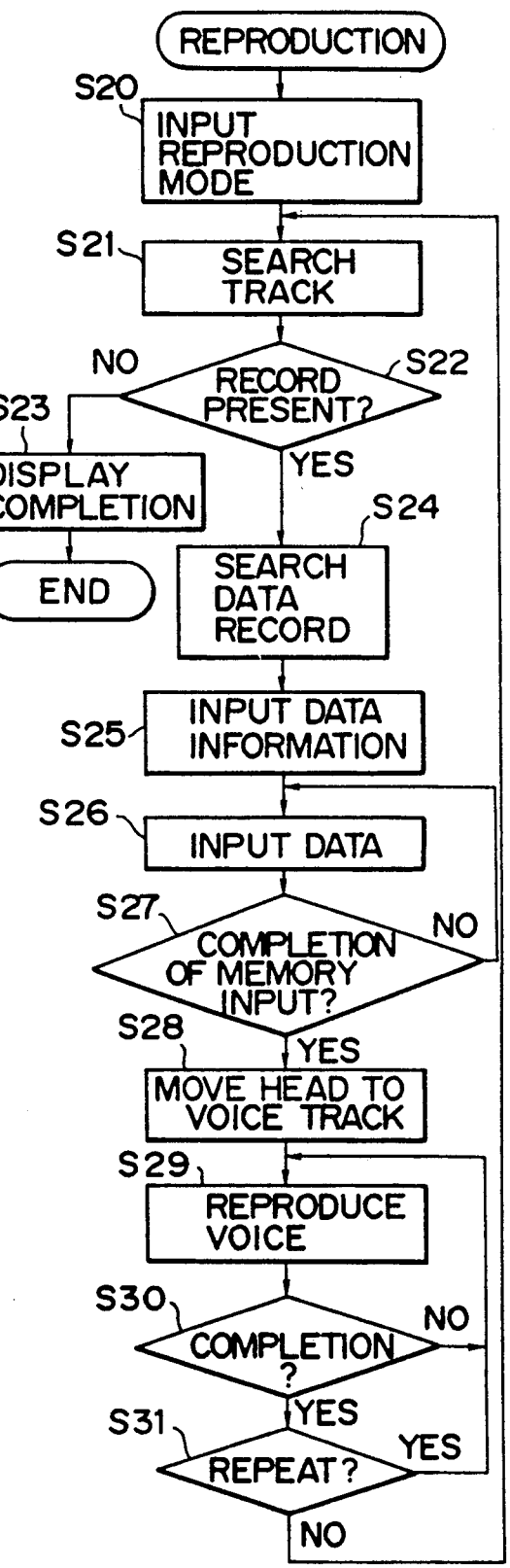

The operation to reproduce the content recorded on the magnetic sheet 148 will now be described with reference to FIG. 10. First, the reproduction mode is indicated by the operation panel 180 (S20). In response to the indication, the CPU 190 searches the recording track on the magnetic sheet 148 (S21). If no recording track exists, the absence of the recording track is displayed by the display 182 and the processing routine is finished (S23). If recording tracks exist, the recording track of the image data is searched and the image data is reproduced and the corresponding voice track, date information, and the like are input to the CPU 190 (S25). The image data is written into the memory 118 (S26, S27). The image data written in the memory 118 is read out and the image is displayed by the video monitor 134. Next, the head 160 is moved to the corresponding voice signal track (S28) and the voice is reproduced (S29, S30). The reproduced voice signal is supplied to the speaker 179. After the voice reproduction is finished, if the user wants to again reproduce and listen to the voice signal, the repeating mode is indicated by the operation panel 180 (S31). If there is no need to repeat the voice signal, the processing routine is returned to step S21 and the information is reproduced from the next recording track. If the recording track to be reproduced is not left, the completion of the reproduction is displayed and the processing routine is finished (S22, S23).

Although the embodiment has been described with respect to the case where the image and voice signals are handled as a pair, the invention is not limited to such a pair. The invention can be also applied to the case of only an image or a voice signal. Further, data such as a program or the like may be also used instead of the image data.

Although an image has been digitally recorded onto the recording medium in the embodiment, the invention is not limited to this. For instance, an image can be recorded in an analog manner and a personal code number can be also recorded into the ID information which is added to the analog image signal.

In the embodiment, the disk-shaped recording medium has been used as memory means. However, the invention is not limited to this but can use a solid-state memory such as a semiconductor memory or the like.

Although the embodiments have been described with respect to the absence recording television telephone as an example, the invention is not limited to the foregoing embodiments but many modifications and variations are possible within the spirit and scope of the appended claims of the invention.

As will be easily understood from the above description, according to the embodiment, images and voice messages can be recorded for a plurality of personal code numbers and the corresponding image and voice message can be transmitted for only the partner who knows the personal code number.

As will be easily understood from the above description, according to the embodiment, even different kinds of signals are recorded onto the disk-shaped recording medium in accordance with their type, so that the recorded content can be easily and promptly checked and the operating efficiency is improved.

We claim:

1. A communicating apparatus comprising:
    a) recording and reproducing means for recording a received signal, including an image signal, onto a recording medium and for reproducing the recorded signal on the recording medium;
    b) control means for allowing said recording and reproducing means to execute a recording operation in accordance with the signal reception;
    c) position memory means for storing information with respect to a recording position of the recording medium; and
    d) control means for allowing said recording and reproducing means to execute the recording and reproducing operation at a position next to a preceding recording position with reference to the stored information in the position memory means when an absence recording mode is set.

2. A communicating apparatus comprising:
    a) memory means for correspondingly storing a voice signal and a corresponding image signal;
    b) means for discriminating an identifying code as to signals to be transmitted upon reception of said identifying code, said identifying code being input through a line; and
    c) means for transmitting the voice signal and image signal stored in said memory means as a pair to said line in accordance with the result of the discrimination of said discriminating means, said transmitting means transmitting said voice signal and said image signal in time division so that the image signal is transmitted before the voice signal.

3. An apparatus according to claim 1, further comprising:
    d) reading means for reading out the voice signal and image signal stored in said memory means.

4. An apparatus according to claim 1, wherein said memory means is a disk-shaped recording medium.

5. An apparatus according to claim 1, wherein said line is a public telephone line.

6. An apparatus according to claim 5, wherein said identifying code is a beep sound which is input through said telephone line.

7. An apparatus according to claim 1, wherein said image signal is a still image signal.

8. An apparatus according to claim 1, wherein said voice signal is time base compressed and stored into said memory means.

9. An apparatus comprising:
    a) receiving means for receiving data including a voice signal and an image signal; and
    b) discriminating means for discriminating the voice signal and the image signal in the data received by said receiving means; and
    c) recording means for recording said voice signal and said image signal onto a medium by different recording systems in accordance with the result of the discrimination of said discriminating means, the voice signal and the image signal being recorded on the same medium in different manners.

10. An apparatus according to claim 9, wherein said recording means time base compresses said voice signal and then records the compressed voice signal.

11. An apparatus according to claim 9, wherein said recording means records said voice signal onto the medium in an analog manner.

12. An apparatus according to claim 9, wherein said recording means digitally records said image signal onto the medium.

13. An apparatus according to claim 9, wherein said receiving means receives the data through a telephone line.

14. An apparatus according to claim 12, wherein when the image signal is recorded onto the medium, said recording means adds an error correction code to the image signal and then records the image signal.

15. An apparatus according to claim 9, wherein said medium is a disk-shaped recording medium.

16. An apparatus according to claim 9, wherein said receiving means receives a command indicative of the kind of reception data before said data is received.

17. An apparatus according to claim 16, wherein said discriminating means discriminates said command, thereby discriminating the voice signal and the image signal in said data.

18. A communicating apparatus comprising:

a) reproducing means for reproducing an image signal stored in memory means;
b) receiving means for receiving an image signal from a common line;
c) discriminating means for discriminating whether the signal from the common line has been received or not; and
d) supplying means for supplying to a monitor at least either one of the image signal reproduced by said reproducing means and the image signal received by said receiving means,
wherein said supplying means changes the image signal to be supplied to the monitor in accordance with the result of the discrimination of said discriminating means.

19. An apparatus according to claim 18, further comprising:
said monitor.

20. An apparatus according to claim 18, wherein said memory means is a disk-shaped recording medium.

21. An apparatus according to claim 18, further comprising:
control means for allowing the image signal received by said receiving means to be stored into said memory means.

22. An apparatus according to claim 18, wherein said receiving means receives an image signal from a telephone line.

23. An apparatus according to claim 18, wherein in the case where it is determined by said discriminating means that the signal from the common line has been received while the image signal reproduced by said reproducing means is being supplied to said monitor, said supplying means switches the image signal to be supplied to the monitor to the image signal received by the receiving means.

* * * * *